# 2,814,576

PROCESS FOR PRODUCING FAST DYEINGS ON ANODICALLY OXIDIZED ALUMINIUM

Christian Zickendraht, Binningen, and Robert Wittwer, Basel, Switzerland, assignors to Ciba Limited, Basel, Switzerland, a Swiss firm No Drawing. Application January 26, 1953, Serial No. 333,364

Claims priority, application Switzerland January 30, 1952

10 Claims. (Cl. 148—6.1)

This invention provides a process for the fast dyeing of anodically oxidized aluminium from an aqueous dyebath, which process is characterized in that there is used as dyestuff a cobalt or copper compound of a monoazodyestuff which contains at least two sulfonic acid groups and corresponds to the general formula (1) 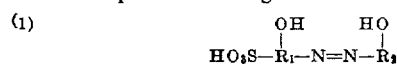

in which $R_1$ represents a benzene radical bound in the 1-position to the hydroxyl group, in the 2-position to the azo linkage and in the 6-position to the sulfonic acid group, and $R_2$—OH represents the radical of a hydroxy-compound bound to the azo linkage in a position vicinal to the hydroxyl group, and which radical contains two 6-membered rings fused together having as members of the ring 9 or 10 carbon atoms and as a hetero atom at most one nitrogen atom in an α-position.

It is to be understood that the term "aluminium" is used to include aluminium alloys which behave similarly to aluminium with regard to anodic oxidation.

The cobalt and copper compounds used in the present process can be made by treating with an agent yielding cobalt or copper an azo dyestuff of the above general Formula 1.

The monoazo-dyestuffs of the general Formula 1 can be made by known methods from diazotized 2-amino-1-hydroxybenzene-6-sulfonic acids and naphthols or advantageously hydroxyquinolines. As 2-amino-1-hydroxybenzene-6-sulfonic acids there are especially advantageous 2-amino-1-hydroxybenzene-6-sulfonic acids which contain a further substituent advantageously in the 4-position, such as 4-methyl-2-amino-1-hydroxybenzene-6-sulfonic acid, 4-methoxy-2-amino-1 - hydroxybenzene - 6 - sulfonic acid, 4-bromo-2-amino-1-hydroxybenzene-6-sulfonic acid, 4-chloro-2-amino-1-hydroxybenzene-6-sulfonic acid, 4-nitro-2-amino-1-hydroxybenzene-6-sulfonic acid, 4-acetylamino-2-amino-1-hydroxybenzene-6-sulfonic acid, 4-tertiaryamyl-2-amino-1-hydroxybenzene-6-sulfonic acid and especially 2-amino-1-hydroxybenzene-4:6-disulfonic acid. As naphthols there may be used 2-hydroxynaphthalene and nuclear substitution products thereof, for example, its monosulfonic acids, and also 1-hydroxynaphthols capable of coupling in the 2-position. Especially valuable results are obtained with hydroxyquinolines capable of coupling in a position vicinal to the hydroxyl group, such as N-methyl, N-n-butyl- or N-phenyl-4-hydroxyquinolone-(2) and especially 2:4-dihydroxy-quinoline. When the 2-amino-1-hydroxybenzene-6-sulfonic acid used as diazo component is free from further sulfonic acid groups, at least one sulfonic acid group must be present in the coupling component.

The conversion of the dyestuffs into the cobalt or copper compounds used in the present process may be carried out while they are in the coupling mixture. Alternatively, this conversion may be carried out upon the filtered dyestuff or the dyestuff purified by reprecipitation.

As agents yielding cobalt or copper there are advantageously used salts containing the metal as the cation such, for example, as cobalt acetate, cobalt sulfate, copper sulfate or copper acetate. In some cases the use of complex metal compounds is of advantage, for example, in the form of metal-ammine complexes, such as copper-tetramine sulfate from ammonia, pyridine or monoethanolamine, or in the form of compounds which contain one of the said metals bound in complex union in as anion, for example, complex cobalt or copper compounds of alkali salts of aliphatic amino-carboxylic acids or hydroxy-carboxylic acids such as glycocoll, lactic acid and especially tartaric acid, such as sodium copper tartrate.

The treatment with the agent yielding cobalt or copper can be carried out in known manner, for example, by heating at a temperature within the range of 50–120° C. in an open vessel, for example, under reflux, or, if desired, in a closed vessel under pressure. The pH value depends on the nature of the metallizing process used, for example, an acid coppering with copper sulfate, and an alkaline coppering with copper-tetrammine sulfate. If desired, further substances such, for example, as alcohol, may be present during the metallization.

With regard to the choice of the metallizing process, it suffices with the dyestuffs used in this invention to use a short period of treatment at a temperature of 70–90° C. with salts such as acetates or sulfates.

In the process of this invention dyeing is carried out in a dyebath containing an aqueous solution of the cobalt or advantageously copper compound of a monoazo-dyestuff of the general Formula 1. There may also be present in the dyebath together with the metal compound used salts, for example, buffer salts or other additions which control the pH value and thereby the absorption of the dyestuff. For example, the dyebath may be given a pH value within the range of about 5 to about 7 by means of sodium acetate and acetic acid.

After the dyeing operation of the dyed aluminium is finished in the usual manner, for example, by a known sealing treatment.

By the present process there are produced on anodically oxidized aluminium very valuable dyeings which are in general distinguished by their very good fastness to the weather and light.

The following example illustrates the invention, the parts and percentages being by weight:

An article of pure aluminium, which has been anodically oxidized in the usual manner in a sulfuric acid electrolyte at a current density of 1.5 amperes per square decimetre, is treated for ½ hour at 65° C. in a dyebath which contains 0.05–0.2 gram per liter of the dyestuff prepared as follows:

46.3 parts of the sodium salt of the dyestuff from diazotized 2-amino-1-hydroxybenzene-4:6-disulfonic acid and 2:4-dihydroxyquinoline are dissolved in 150 parts of water at 70–75° C., and the resulting solution is mixed with 20 parts of crystalline sodium acetate and 120 parts of a copper sulfate solution containing 7.8 parts of copper. The whole is stirred for 30 minutes at 70–75° C., and the copper complex formed is precipitated by the addition of sodium chloride and filtered off. The resulting cupriferous dyestuff is then dried. It is a water-soluble brown powder which dissolves in water and concentrated sulfuric acid with an orange-yellow coloration.

There are obtained bronze colored tints, which have an excellent fastness to light after the usual sealing treatment in boiling water.

Copper red tints are obtained with the cobalt compound of the above dyestuff.

If desired, the dyebath may be given a pH value of about 5, for example, by the addition of 10 grams per liter of crystalline sodium acetate and 1 cc. per liter of acetic acid of 40 percent strength, whereby absorption of the dyestuff is accelerated.

By using, instead of the above mentioned dyestuff, the copper complex of the dyestuff from diazotized 2-amino-1-hydroxybenzene-4:6-disulfonic acid and β-naphthol, bluish red tints are obtained on anodically oxidized aluminium.

In the following table are given further metal compounds of monoazo-dyestuffs suitable for dyeing anodically oxidized aluminium by the above process. In columns I and II are given the two dyestuff components and in column III the metal. The tint of the dyeing obtained with the metal compound on anodically oxidized aluminium is given in column IV.

|   | I | II | III | IV |
|---|---|---|---|---|
| 1 | 4 - chloro - 2 - amino - 1-hydroxybenzene-6-sulfonic acid. | 1 - hydroxynaphtha-lene - 4 - sulfonic acid. | Cu | Reddish violet. |
| 2 | ---do--- | ---do--- | Co | Do. |
| 3 | ---do--- | 2-hydroxynaphtha-lene-3:6-disulfonic acid. | Cu | Bluish red. |
| 4 | ---do--- | ---do--- | Co | Do. |
| 5 | 2-amino-1-hydroxy-benzene-4:6-disul-fonic acid. | 2-hydroxynaphtha-lene-6-sulfonic acid. | Cu | Red. |
| 6 | ---do--- | ---do--- | Co | Bluish red. |

What is claimed is:

1. A process for fast dyeing anodically oxidized aluminium, which comprises dyeing the anodically oxidized aluminium in an aqueous bath with a member selected from the group consisting of a complex copper and a complex cobalt compound of a monoazo dyestuff corresponding to the formula

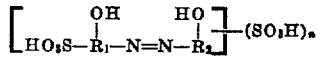

in which $n$ is a whole number of at most 2, $R_1$ represents a benzene radical bound to the hydroxyl group in 1-position, to the azo linkage in 2-position and to the sulfonic acid group in 6-position and $R_2$—OH represents a member of the group consisting of a hydroxynaphthalene and a hydroxyquinoline radical bound to the azo linkage in a position vicinal to the hydroxyl group.

2. A process for fast dyeing anodically oxidized aluminium, which comprises dyeing the anodically oxidized aluminium in an aqueous bath with a complex copper compound of a monoazo dyestuff containing at least two sulfonic acid groups and corresponding to the formula

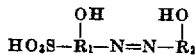

in which $R_1$ represents a benzene radical bound to the hydroxyl group in 1-position, to the azo linkage in 2-position and to the sulfonic acid group in 6-position and $R_2$—OH represents the radical of a hydroxynaphthalene sulfonic acid bound to the azo linkage in a position vicinal to the hydroxyl group.

3. A process for fast dyeing anodically oxidized aluminium, which comprises dyeing the anodically oxidized aluminium in an aqueous bath with a complex copper compound of a moonazo dyestuff corresponding to the formula

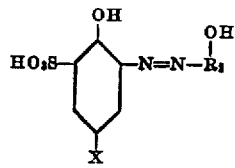

wherein X represents a member selected from the group consisting of a chlorine atom and a sulfonic acid group, and $R_2$ represents the radical of a hydroxy naphthalene monosulfonic acid bound to the azo linkage in a position vicinal to the hydroxyl group.

4. A process for fast dyeing anodically oxidized aluminium, which comprises dyeing the anodically oxidized aluminium in an aqueous bath with a complex copper compound of a monoazo dyestuff corresponding to the formula

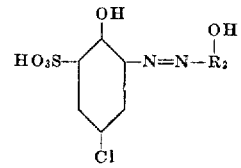

wherein $R_2$—OH represents the radical of a 2-hydroxynaphthalene-sulfonic acid bound to the azo linkage in 1-position.

5. A process for fast dyeing anodically oxidized aluminium which comprises dyeing the anodically oxidized aluminium in an aqueous weakly acid bath with the complex copper compound of the monoazo dyestuff of the formula

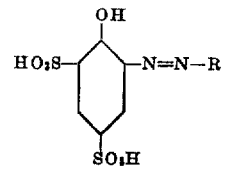

wherein R represents the 2:4-dihydroxyquinoline radical bound to the azo linkage in 3-position.

6. A process for fast dyeing anodically oxidized aluminium which comprises dyeing the anodically oxidized aluminium in an aqueous weakly acid bath with the complex cobalt compound of the monoazo dyestuff of the formula

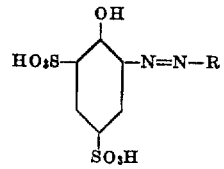

wherein R represents the 2:4-dihydroxyquinoline radical bound to the azo linkage in 3-position.

7. A process for fast dyeing anodically oxidized aluminium which comprises dyeing the anodically oxidized aluminium in an aqueous weakly acid bath with the complex copper compound of the monoazo dyestuff of the formula

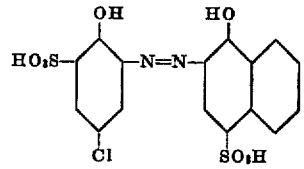

8. A process for fast dyeing anodically oxidized aluminium which comprises dyeing the anodically oxidized aluminium in an aqueous weakly acid bath with the complex copper compound of the monoazo dyestuff of the formula

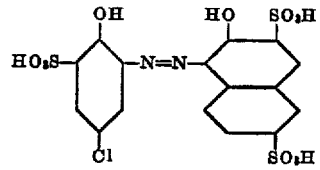

9. A process for fast dyeing anodically oxidized aluminium which comprises dyeing the anodically oxidized aluminium in an aqueous weakly acid bath with the complex copper compound of the monoazo dyestuff of the formula

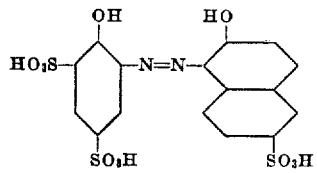

10. Anodically oxidized aluminium dyed by the process according to claim 1.

References Cited in the file of this patent
UNITED STATES PATENTS

| | | |
|---|---|---|
| 1,775,644 | Kammerer et al. | Sept. 16, 1930 |
| 1,865,978 | Straub et al. | July 5, 1932 |
| 1,918,002 | Straub et al. | July 11, 1933 |
| 2,030,236 | Andereau | Feb. 11, 1936 |
| 2,086,854 | Crossley et al. | July 13, 1937 |
| 2,111,270 | Moll et al. | Mar. 15, 1938 |

OTHER REFERENCES

"Synthetic Dyes," by Venkataraman, page 1220.

U. S. DEPARTMENT OF COMMERCE
PATENT OFFICE

CERTIFICATE OF CORRECTION

Patent No. 2,814,576                            November 26, 1957

Christian Zickendraht et al.

It is hereby certified that error appears in the printed specification of the above numbered patent requiring correction and that the said Letters Patent should read as corrected below.

Column 2, line 7, for "copper-tetramine" read -- copper-tetrammine --; line 40, after "operation" strike out "of"; column 3, line 64, for "moonazo" read -- monoazo --.

Signed and sealed this 15th day of April 1958.

(SEAL)
Attest:

KARL H. AXLINE
Attesting Officer

ROBERT C.
                                                               Commission